United States Patent [19]

Okada et al.

[11] Patent Number: 4,877,957

[45] Date of Patent: Oct. 31, 1989

[54] SCANNING TYPE TUNNEL MICROSCOPE

[75] Inventors: Takao Okada; Toshihito Kouchi; Shuzo Mishima; Haruo Ogawa, all of Tokyo; Seizo Morita; Nobuo Mikoshiba, both of Sendai, all of Japan

[73] Assignee: Olympus Optical Co., Ltd., Tokyo, Japan

[21] Appl. No.: 70,775

[22] Filed: Jul. 7, 1987

[30] Foreign Application Priority Data

Jul. 14, 1986 [JP] Japan .................................. 61-165032
Jul. 14, 1986 [JP] Japan .................................. 61-165033
Jul. 14, 1986 [JP] Japan .................................. 61-165034

[51] Int. Cl.$^4$ ............................................. H01J 37/26
[52] U.S. Cl. .................................. 250/306; 250/442.1; 310/328
[58] Field of Search ...................... 250/306, 442.1, 307; 310/328

[56] References Cited

U.S. PATENT DOCUMENTS

| | | | |
|---|---|---|---|
| 3,611,577 | 10/1971 | Smith | 310/328 |
| 4,343,993 | 8/1982 | Binnig et al. | 250/306 |
| 4,422,002 | 12/1983 | Binnig et al. | 310/328 |
| 4,583,135 | 4/1986 | Kimura | 310/328 |
| 4,651,046 | 3/1987 | Ohya et al. | 310/328 |

OTHER PUBLICATIONS

P. E. Smith et al, "Ultrasmall Scanning Tunneling Microscope For Use in a Liquid-Helium Storage Dewar", Rev. Sci. Inst., 57(10), Oct. 1986, pp. 2630-2631.

Binnig et al, "The Scanning Tunneling Microscope", Scientific American, Aug. 85, pp. 50-56.
Blackford et al, "High-Stability bimorph scanning tunneling microscope", Rev. Sci. Instrum. 58(8), Aug. 1987.
Drake et al, "Tunneling Microscope for Operation in Air or Fluids", Rev. Sci. Instrum., 57(3), Mar. 1986.
Sonnenfeld et al, "Atomic-Resolution Microscopy in Water", Science, Apr. 1986.

*Primary Examiner*—Carolyn E. Fields
*Assistant Examiner*—John A. Miller
*Attorney, Agent, or Firm*—Frishauf, Holtz, Goodman & Woodward

[57] ABSTRACT

A scanning type tunnel microscope comprises a sample holding member for supporting a sample and a scanning probe which is arranged to face the sample to be separated therefrom by a very small distance and a supported by a scanning probe holding member. A tunnel current is flowed between the sample and scanning probe upon application of a voltage thereacross. A first actuator is coupled to the sample holding member and a second actuator is coupled to the scanning probe holding member so that the first and second actuators relatively drive said sample and said scanning probe in an axial direction and in a planar direction through said sample holding member and said scanning probe holding member. A differential micrometer is connected to the first actuator to move the actuator in the axial direction, and the micrometer and the second actuator are fixed on a substrate.

19 Claims, 8 Drawing Sheets

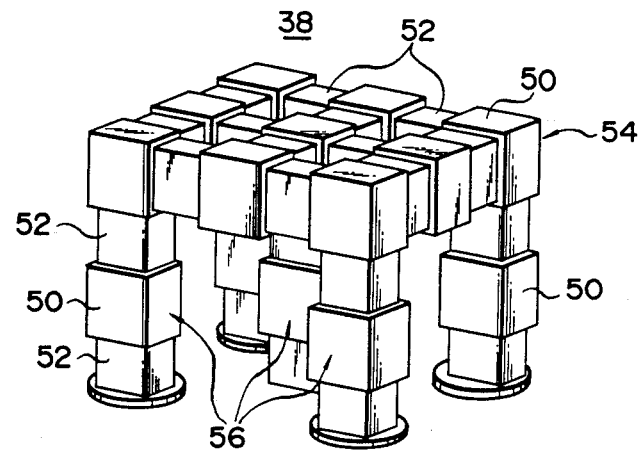
FIG. 3
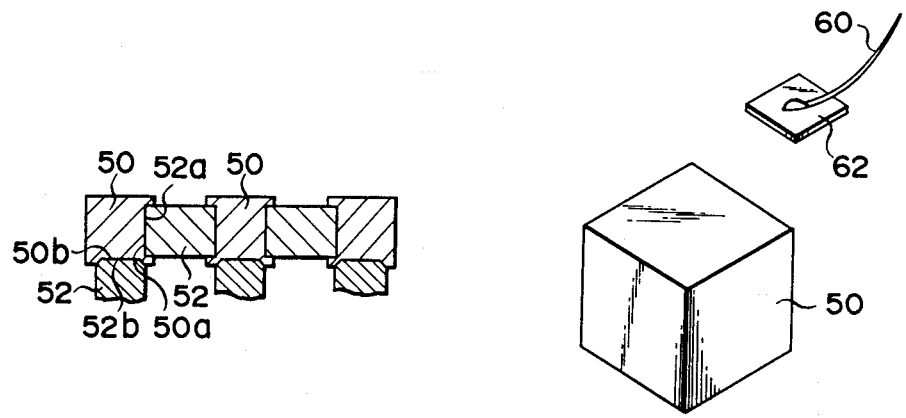
FIG. 4
FIG. 5

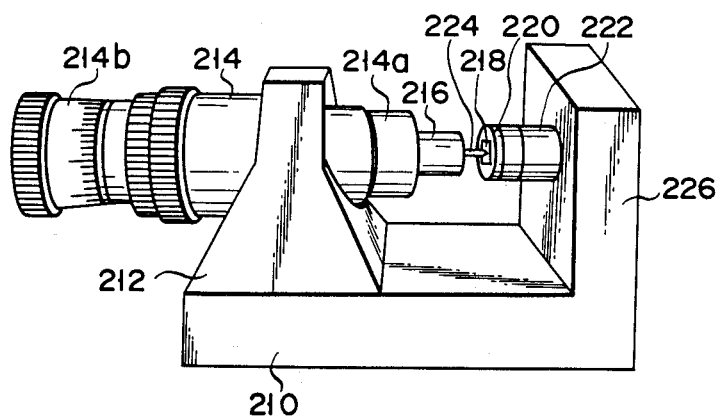
F I G. 14
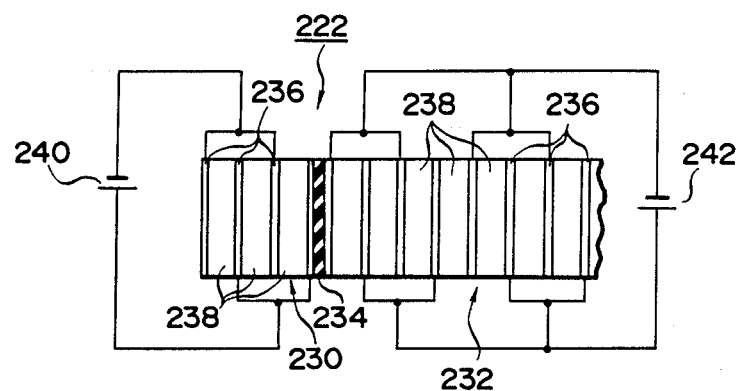
F I G. 15

SCANNING TYPE TUNNEL MICROSCOPE

BACKGROUND OF THE INVENTION

The present invention relates to a scanning type tunnel microscope for measuring a tunnel current flowing between a scanning probe and an observation surface of a sample while they are kept at a minimum distance, e.g., 50Å or less, and moving the scanning probe in the axial direction to always obtain a constant tunnel current, thereby obtaining an image of the observation surface.

A microscope of this type allows observation of the surface structure of a sample with high resolution on the order of several angstroms or less, and will not damage the observation surface of the sample at all. In this manner, the microscope has superior characteristics to those of microscopes of other types.

However, conventionally, in order to obtain such a high resolution, a known scanning type tunnel microscope described in U.S. Pat. No. 4,343,993 must have a structure for preventing the influence of external vibration as much as possible, and its main part must be housed in a vacuum chamber to be driven in high vacuum. For this reason, the entire apparatus becomes bulky, and an operation is cumbersome.

SUMMARY OF THE INVENTION

It is an object of the present invention to provide a scanning type tunnel microscope which can obtain a high resolution without driving in high vacuum, can be rendered compact, and has excellent operability.

BRIEF DESCRIPTION OF THE DRAWINGS

FIG. 3 is a perspective view of an actuator used in the microscope shown in FIG. 1;

FIG. 4 is a sectional view of a structure after a piezoelectric member and an electrode are assembled for explaining assembly of the actuator;

FIG. 5 is a perspective view for explaining wiring of lead wires of the actuator;

FIGS. 11 and 12 show a microscope according to a second embodiment of the present invention, in which FIG. 11 is a perspective view and FIG. 12 is a front view;

FIG. 14 is a perspective view of a microscope according to a fourth embodiment of the present invention; and FIG. 15 is a view showing an actuator used in the fourth embodiment.

DETAILED DESCRIPTION OF THE PREFERRED EMBODIMENTS

A scanning type tunnel microscope according to an embodiment of the present invention will now be described with reference to the accompanying drawings.

Figure 1:
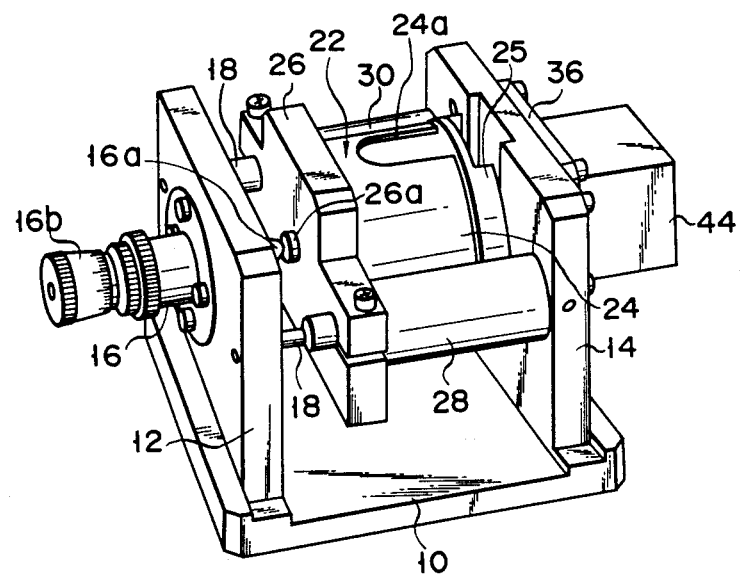
FIG. 1 is a perspective view showing an entire scanning type tunnel microscope according to a first embodiment of the present invention.
Figure 2:
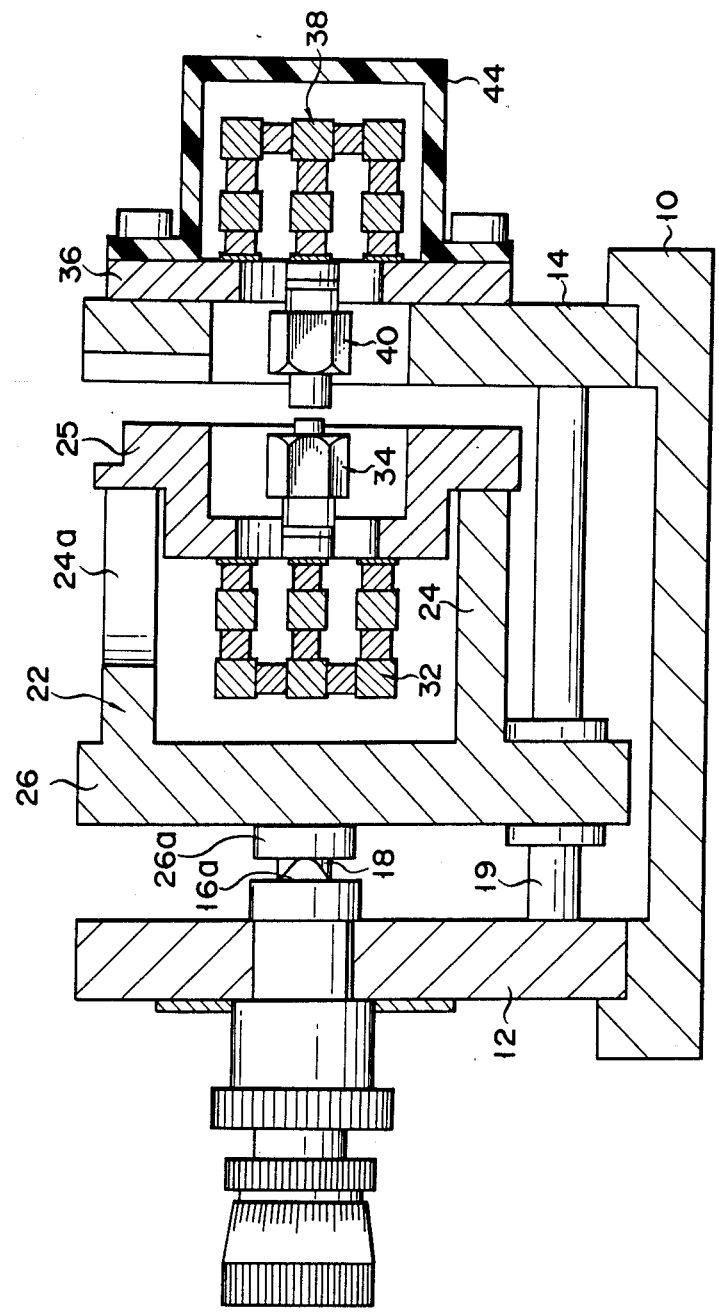
FIG. 2 is a sectional view of the microscope shown in FIG. 1.

Referring to FIGS. 1 and 2, reference numeral 10 denotes a square substrate having a side of 10 cm. Substrate 10 is a stainless steel plate whose upper and lower two surfaces are polished with high precision. First and second support plates 12 and 14 project upright on the upper surface of substrate 10 near its two ends so as to face each other. Differential micrometer 16 is horizontally fixed on substantially the central portion of first support plate 12 to be perpendicular to support plate 12. Front end portion 16a of micrometer 16 projects toward second support plate 14 from the rear surface of plate 12, and operation portion 16b as a rear end portion thereof projects from the front surface of support plate 12. When operation portion 16b is rotated through a predetermined angle, front end portion 16a of micrometer 16 is moved by a very small distance along the axial direction, as is well known. Micrometer 16 constitutes a sample rough drive mechanism. Three guide shafts 18 and 19 each have two ends fixed to support plates 12 and 14, are arranged in a triangle and are horizontally arranged between support plates 12 and 14 to be separated at a predetermined distance and parallel to each other. Sliding unit 22 is slidably supported by shafts 18 and 19. Unit 22 is integrally assembled from stainless steel and consists of cylindrical front portion 24, planar rear portion 26, and disk plate 25 for supporting actuator 32 (FIG. 2). Through holes are formed in two sides and a lower central portion of rear portion 26. Guide shafts 18 and 19 extend through the through holes, thus allowing a slidable movement of unit 22. A pair of elastic members 28 and 30 are respectively mounted on a pair of shafts 18 extending near the two sides of rear portion 26 to be located between rear portion 26 and second support plate 14, so that two end faces of each of members 28 and 30 abut against portion 26 and plate 14, respectively. These elastic members 28 and 30 are formed of a synthetic rubber, e.g., urethane, to have a cylindrical shape. Shafts 18 are loosely inserted in members 28 and 30, respectively. Columnar projection 26a is formed on the central portion of the rear surface of rear portion 26. The end face of projection 26a abuts against the front end of micrometer 16. When operation portion 16b of micrometer 16 is rotated in one direction, sliding unit 22 is moved forward against the elastic force of elastic members 28 and 30. When portion 16b is rotated in the other direction, unit 22 is moved backward by the elastic force of members 28 and 30. Lead wire guide slit 24a is formed on the upper portion of front portion 24 of unit 22 to be notched from its front end side. First actuator 32 is housed in cylindrical front portion 24, as shown in FIG. 2. Sample holding portion 34 for holding a sample at its distal end face is fixed to the central portion of actuator 32. First actuator 32 has a function of moving sample holding member 34 in the axial direction by a very small distance and a function of roughly moving it in a planar direction perpendicular to the axis upon selective application of a voltage. Second support plate 14 has a central opening, and second actuator 38 is fixed to its front surface through mounting plate 36. Second actuator 38 is plane-symmetrical with first actuator 32, and has substantially the same shape and dimensions as those of actuator 32. Mounting plate 36 has a central opening, and is detachably mounted on support plate 14 by bolts through screw holes formed near its peripheral edge. Scanning probe holding member 40 extends through the openings of mounting plate 36 and second support plate 14 to project backward and is fixed to the central portion of second actuator 38. Scanning probe 42 (FIG. 10) is mounted on the distal end of holding member 40. Holding members 40 and 34 are arranged coaxially with differential micrometer 16, so that the scanning probe and the sample supported by these holding members coaxially face each other. Second actuator 38 is housed in synthetic resin cover 44 detachably mounted on mounting plate 36 by screws so as to be protected from external disturbance. Second actuator 38 has a function of moving scanning probe holding member 40 in the axial direction and a planar direction perpendicular thereto upon selective application of a voltage. A distance between unit 22 and support plate 14 is decreased as small as possible, and slit 24a is also formed, as narrow as possible, so that the scanning probe and the sample are enclosed by unit 22 and plate 14. For this reason, the influence of external acoustic vibration and magnetism also may be eliminated.

Second actuator 38 will only be described in detail with reference to FIGS. 3 to 5 since first and second actuators 32 and 38 have the same structure.

Referring to FIG. 3, reference numeral 50 denotes electrodes formed of a conductive material, e.g., stainless steel. 3×3, i.e., 9 electrodes 50 are arranged in a matrix. Each electrode 50 has a cubic shape each surface of which is subjected to high-precision surface finishing. Piezoelectric member 52 is interposed between each two adjacent electrodes 50, thereby constituting grid-like plane portion 54. Each piezoelectric member 52 has a cubic shape slightly smaller than that of electrode 50, and each surface is subjected to high-precision plane finishing. Five leg portions 56 project from plane portion 54 to extend vertically in the same direction. Each leg portion 56 is constituted by a pair of piezoelectric members 52 and electrode 50 interposed therebetween. One piezoelectric member 52 of each leg portion 56 is mounted on the same side of each of five electrodes 50 located at four corners and the center of surface portion 54. Above-mentioned scanning probe holding member 40 (sample holding member 34) is mounted on the distal end of central leg portion 56. The distal ends of four leg portions 56 located at four corners are fixed to mounting plate 36 (disk plate 25). Note that electrodes 50 and piezoelectric members 52 which are respectively formed of the same materials and have the same dimensions are adopted. Insulating members may be added between the distal ends of four leg portions 56 and mounting plate 36.

Each piezoelectric member 52 has anisotropy. Therefore, when the actuator is constituted, all electrodes 50 are preferably arranged to have the same rolling direction. Then, the scanning probe and the sample can be precisely moved. For this purpose, a mark having directivity, such as a line or a groove is formed on the surface of each electrode 50, and the electrodes and the piezoelectric members are assembled so that these marks coincide with each other. As shown in FIG. 4, recesses 50a and 50b having directivity are pre-formed on the both surfaces of each electrode 50 to which piezoelectric members 52 are coupled, and side surfaces 52a and 52b of piezoelectric members 52 are formed in correspondence with recesses 50a and 50b of electrodes 50 which are coupled in the longitudinal and lateral directions, respectively. The electrodes and the piezoelectric members can be arranged such that the rolling directions can be aligned in a predetermined direction when they are coupled after these recesses and the side surfaces of piezoelectric members 52 coincide with each other. Thus, assembly of the actuator can be facilitated.

A lead wire must be connected to each electrode 50 in order to apply a voltage thereto. The lead wire must be thin (e.g., about 0.2 mm) in order to reduce transmission of vibration through the lead wire as small as possible. The piezoelectric member may be degraded by heat. For these reasons, the lead wire is preferably connected as follows.

As shown in FIG. 5, the distal end of lead wire 60 is soldered to square conductive foil 62 which is formed of, e.g., stainless steel or phosphor bronze, and has a side of 2 mm. Conductive foil 62 is adhered to one surface of electrode 50 by a conductive adhesive. With this method, since lead wire 60 is soldered to conductive foil 62, even if a thin lead wire is adopted, it can have a high bonding strength. Since electrode 50 and conductive foil 62 are connected through the conductive adhesive which does not require heating at a high temperature, the piezoelectric member which has been already mounted on electrode 50 cannot be degraded. If the lead wire and the electrode are connected by soldering, soldering to stainless steel is difficult to achieve and heating upon soldering degrades the piezoelectric member. If the conductive adhesive is directly used, a sufficient bonding strength cannot be obtained. As the conductive adhesive, a cold-setting adhesive, an instant adhesive and the like can be employed.

In the actuator with the above structure, the piezoelectric member located between the predetermined electrodes can be expanded upon application of a voltage across the predetermined electrodes, so that the sample and the scanning probe supported by the holding members can be moved by a predetermined distance with high controllability. In this case, when a voltage is applied across the electrodes constituting surface portion 54, the holding member is moved in a planar direction (X-Y direction). On the other hand, when a voltage is applied across the electrodes of leg portions 56, the holding member is moved in the axial direction (Z direction). The piezoelectric members of first and second actuators 32 and 38 may be formed of an identical material. In this embodiment, the piezoelectric members of first actuator 32 are expanded by a larger distance than that of actuator 38 upon application of a constant voltage. For example, the piezoelectric member of first actuator 32 is formed of a material having a D coefficient (polarization constant) of 6 Å/V, and the piezoelectric member of second actuator 38 is formed of a material having a D coefficient of 3 Å/V. Thus, in scanning in the planar direction caused by the relative movement between the scanning probe and the sample, the second actuator can perform scanning within a frame with a relatively short moving distance and the first actuator can perform scanning between the frames with a relatively long distance, so that a wide range of scanning area can be selected in a short time. The first actuator is driven stepwise within a plane, and the second actuator scans a small-area section in correspondence with each step, so that an image of a wide area of an observed surface can be obtained with high resolution.

Sample holding member 34 will now be described with reference to FIGS. 6 and 7.

Figure 6:
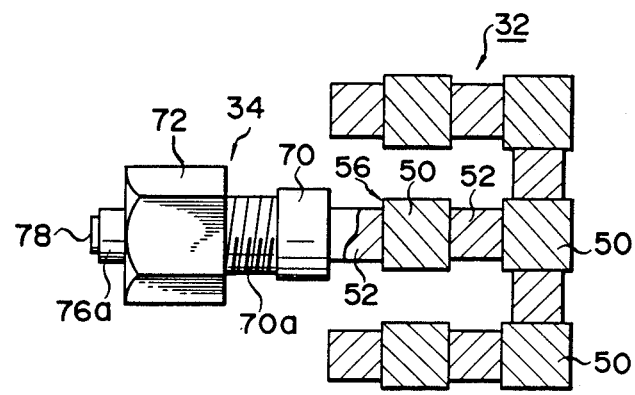
FIG. 6 is a partially cutaway sectional view showing the actuator and a sample holding mechanism.
Figure 7:
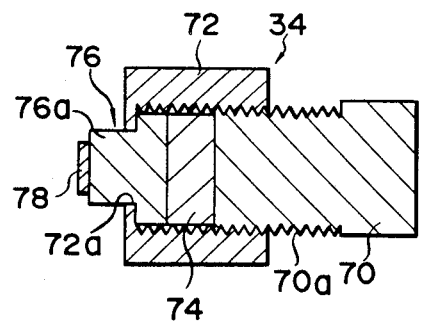
FIG. 7 is a sectional view of the sample holding mechanism.

Referring to FIGS. 6 and 7, reference numeral 70 denotes a columnar supporter whose rear end is fixed to central leg portion 56 of first actuator 32. A male-threaded portion is formed on the outer surface of small-diameter portion 70a at the distal end of supporter 70. A female-threaded portion is formed on the inner surface of cylindrical holder 72 having an open rear end, which is threadably engaged with the male-threaded portion of supporter 70, from the open side. Circular hole 72a is formed at the center of the closed wall of the front end of holder 72. Circular press plate 74 is inserted in holder 72 to abut against the front surface of small-diameter portion 70a of supporter 70. Sample table 76 is housed in holder 72 to abut against press plate 74. Circular projection 76a is formed on the central portion of sample table 76. Projection 76a has a slightly smaller diameter than that of circular hole 72a, and is capable of extending therethrough. Thin-plate or foil-like sample 78 is mounted on the front surface of projection 76a. After sample table 76 is inserted in holder 72 together with press plate 74, small-diameter portion 70a is screwed, so that sample table 76 is fastened between press plate 74 and the closed wall of holder 72. Sample 78 mounted on projection 76a is fixed while projecting from holder 72. Since press plate 74 is very small, a "+" screw groove is formed on the rear surface to facilitate handling upon assembly or disassembly, so that press plate 74 with sample table 76 can be supported by a "+" driver. Of course, the press plate may be supported by any other means.

Figure 8:
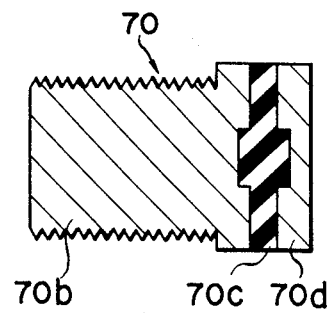
FIG. 8 is a sectional view showing a supporter of the sample holding mechanism.

A lead wire for applying a voltage to sample 78 can be connected to holder 72 if it is formed of a conductive material. If a structure shown in FIG. 8 is adopted, the assembly or disassembly of holder 72 can be facilitated. More specifically, supporter 70 employs a three-layered structure consisting of conductor 70b, insulating member 70c, and conductor 70d, and the lead wire is connected to conductor 70b.

Scanning probe holding mechanism 40 will now be described with reference to FIGS. 9 and 10.

Figure 9:
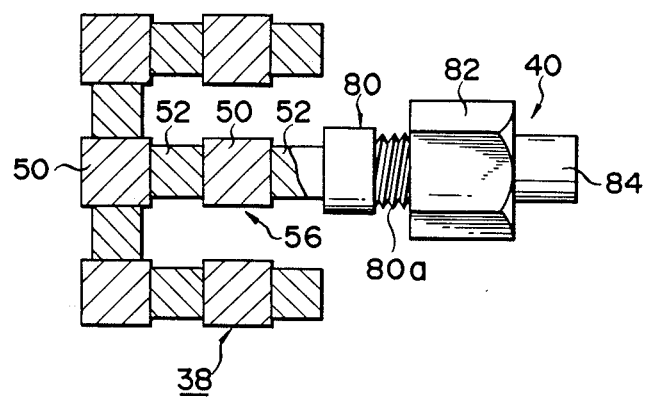
FIG. 9 is a partially cutaway sectional view showing the actuator and a scanning probe holding mechanism.
Figure 10:
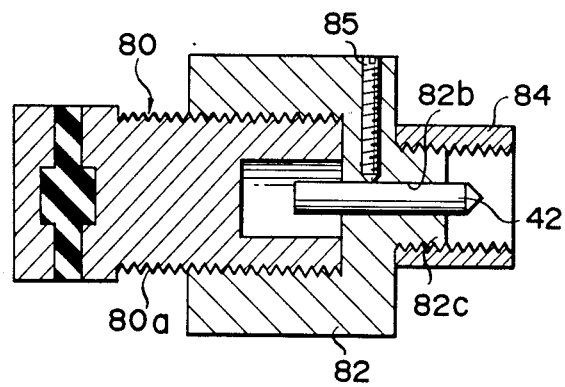
FIG. 10 is a sectional view of the scanning probe holding mechanism.

Referring to FIGS. 9 and 10, reference numeral 80 denotes a columnar supporter whose front end is fixed to central leg portion 56 of second actuator 38. A male-threaded portion is formed on the outer surface of small-diameter portion 80a of the distal end portion of supporter 80. A female-threaded portion is formed on the inner surface of cylindrical holder 82 having an open front end, which is threadably engaged with the male-thread of supporter 80, from the open side. Through hole 82b is formed in the central portion of holder 82 to extend therethrough in the axial direction. Scanning probe 42 is fixed inside through hole 82b, so that its distal end projects backward from holder 82. Scanning probe 42 can be fixed to holder 82 by various methods such as a method using a conductive adhesive, a metal bushing method wherein the probe is inserted into a soft metal pipe and the assembly is inserted under pressure in through hole 82b, and the like. In this embodiment, a screw hole extending from the outer surface of holder 82 to through hole 82b is formed, and screw 85 is screwed therein to fix the scanning probe. Circular mounting portion 82c is arranged on the central portion of the rear surface of holder 82 to project coaxially with through hole 82b. A male-threaded portion is formed on the outer surface of mounting portion 82c. Mounting portion 82c has a slightly larger diameter than that of through hole 82c. A female-threaded portion is formed on the cylindrical cap 84 having open ends, which is threadably engaged with mounting portion 82c to project backward from the distal end of probe 42, thereby protecting the distal end of probe 42 as shown in FIG. 10. Cap 84 is adopted to protect an auxiliary scanning probe arranged integrally with holder 82. After holder 82 is mounted on supporter 80, cap 84 is removed. In this embodiment, cap 84 having open ends is employed. However, a cap which has a closed end to cover the upper portion of the distal end of the scanning probe may be adopted.

Scanning probe 42 used in this embodiment is prepared as follows. The distal end of a thin wire having a diameter of 0.1 to 1 mm and of tungsten, molybdenum, gold, or the like is machine-ground to have a 90-degree conical shape. Thereafter, the resultant structure is subjected to electrolyte grinding to have a radius of curvature of about 50 mm at the distal end. For the same reason as in the above description of supporter 70 with reference to FIG. 8, supporter 80 employs a three-layered structure wherein an insulating member is sandwiched between conductors. Therefore, it is convenient for attaching and detaching holder 82. Note that the above-mentioned apparatus is mounted on a known vibration absorbing apparatus (not shown) and is prevented from being influenced by external vibration.

A case will be described wherein a three-dimensional pattern on a surface of a metal segment as a sample is measured using the scanning type tunnel microscope with the above structure.

Sample 78 is mounted on sample table 76, and sample table 76 is fixed to supporter 70 by holder 72. A predetermined voltage (0.1 to 10 V) is applied across sample 78 and scanning probe 42. First actuator 32 is roughly moved in the axial direction by differential micrometer 16 to move sample 78 toward scanning probe 42. A voltage is applied to the electrodes of leg portions 56 of first actuator 32, thereby moving sample holding member 34 in the axial direction. Thus, sample 78 approaches scanning probe 42 to establish a vacuum tunnel region (about 10 Å) therebetween. A tunnel current can be measured so as to discriminate whether or not the sample has reached the tunnel region. In this state, a voltage is applied to the predetermined electrodes of second actuator 38 to move scanning probe 42 by a very small distance in the planar direction. Probe 42 is also moved in the axial direction to render the measured tunnel current constant. A piezoelectric voltage for moving probe 42 in the axial direction is measured, and a two-dimensional image of the surface of the sample is formed using the measured voltage as a signal. The piezoelectric voltage represents a function between a work function of the sample and a gap between the sample and the scanning probe. If the surface of the sample is roughened or is contaminated, the voltage represents this. Therefore, the two-dimensional image is image-processed, so that the surface of the sample can be three-dimensionally observed. The above operation is performed under an atmosphere.

In this embodiment, the actuator employs a tower-like structure having a plane portion consisting of electrodes and piezoelectric members and five leg portions vertically projecting from the plane portion. However, other structures, e.g., consisting of piezoelectric members having three leg portions and electrodes arranged at the distal ends of the leg portions may be employed. A drive mechanism for roughly moving the first actuator can be a mechanical means such as a differential micrometer or an electrical means using piezoelectric members. The first and second actuators need only have an identical or similar shape, but need not be formed of an identical material like in the above embodiment wherein piezoelectric members having different D coefficients are used.

In the above embodiment, the sample is observed upon scanning by the scanning probe. However, the scanning operation may be performed by the sample while fixing the scanning probe in position.

In the scanning type tunnel microscope of this embodiment, since the first and second actuators have a substantially identical shape and are plane-symmetrical, they are vibrated by the same magnitude with respect to external vibration. For this reason, as compared to a case wherein different actuators are used and wherein they are asymmetrical, vibration of the scanning probe and the sample can be minimized. Therefore, if the microscope is driven under an atmosphere, a high resolution can be obtained, the entire microscope can be rendered compact, and excellent operability can be obtained.

A scanning type tunnel microscope according to a second embodiment of the present invention will now be described with reference to FIGS. 11 and 12. In these figures, reference numeral 110 denotes a square substrate having a side of several centimeters. Substrate 110 is a stainless steel plate or an Invar alloy plate, the both surfaces of which are polished with high precision. Substantially triangular support plate 112 projects upright from a left end portion of the upper surface of substrate 110 to be integral therewith. Differential micrometer 114 is horizontally fixed to substantially the central portion of support plate 112 to be perpendicular to support plate 112. Front end portion 114a of micrometer 114 projects toward the other end side of substrate 110 from the front surface of support plate 112. Operation portion 114b as the rear end portion of micrometer 114 projects from the rear surface of support plate 112. As is well known, when operation portion 114b is pivoted through a predetermined angle, front end portion 114a of micrometer 114 is moved by a very small distance, and constitutes a rough movement drive mechanism of the sample. First actuator 116 for moving the sample is arranged on the front surface of the front end portion of micrometer 114. Actuator 116 is a known one, and adopts piezoelectric elements capable of moving along one axis (the axial direction of the differential micrometer) or cylindrical piezoelectric elements capable of moving along three axes (X, Y, and Z axes). A case will be described wherein the actuator employs the piezoelectric elements capable of moving along one axis.

Sample table 120 on which sample 118 is mounted is coaxially fixed to the front surface of actuator 116. Actuator 116 has a function of moving sample 118 by a very small distance in the axial direction. Second actuator 122 is fixed to the other end side of substrate 110 to face first actuator 116. Second actuator 122 includes first to third piezoelectric leg portions 124, 126, and 128 each of which has the right end portion fixed and the other end projecting at a substantially right angle. The other end of each of first and second leg portions 124 and 126 is fixed to the right end of portion substrate 110, and one end obliquely projects to be located at the center. Third leg portion 128 projects to be parallel to the upper surface of substrate 110 so as to locate first actuator 116 between itself and substrate 110. The other end of leg portion 128 is fixed to mounting member 130 fixed on the upper surface of support plate 112 by screws, thereby completing a closed frame around said sample. Said piezoelectric leg portion may be made of a single elongated 1 piezoelectric member or a multi-layered piezoelectric member. Scanning probe holding member 132 projects downward from the one end portions of leg portions 124, 126, and 128 which are coupled to each other. A horizontal through hole is formed in the lower portion of holding member 132. Scanning probe 134 whose distal end projects to face sample 118 is fixed inside the through hole. Scanning probe 134, sample 118, first actuator 116, and differential micrometer 114 are coaxially arranged. The axes of the above components and third leg portion 128 are located on an identical vertical plane. When voltages are selectively applied to leg portions 124, 126, and 128, independently, the piezoelectric members of the leg portions of second actuator 122 are expanded, thereby moving scanning probe 134 in the axial direction and in the planar direction perpendicular to the axis by a very small distance.

A case will be described wherein a three-dimensional pattern on a surface of a metal segment as a sample is measured using the scanning type tunnel microscope with the above structure.

A predetermined voltage (0.1 to 10 V) is applied across sample 118 and scanning probe 134. First actuator 116 is roughly moved in the axial direction by differential micrometer 114 to move sample 118 toward scanning probe 134. A voltage is applied to the electrodes of first actuator 116, so that sample 118 further approaches scanning probe 134 to establish a vacuum tunnel region (about 12 Å) therebetween, and a tunnel current is then measured.

In this state, voltages are applied to the predetermined electrodes of second actuator 122 to move scanning probe 134 in the planar direction, thereby scanning the observation surface. Based on the measured tunnel current, scanning probe 134 is also moved by a very small distance in the axial direction to render the tunnel current constant. A piezoelectric voltage for moving probe 134 in the axial direction in this case is measured, and a two-dimensional image of the surface of the sample is formed using the measured voltage as a signal. When a one-axial direction drive element such as a multi-layered piezoelectric element is used, biasing spring 142 can be additionally used to obtain a better effect, as shown in FIG. 13.

Figure 13:
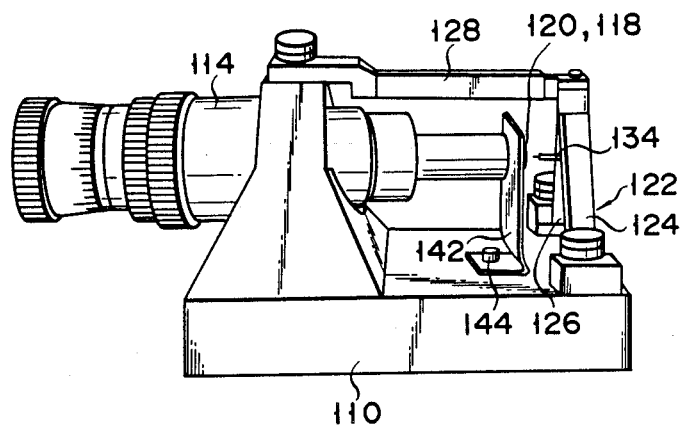
FIG. 13 is a perspective view showing a microscope according to a third embodiment of the present invention.

Referring to FIG. 13, first actuator 116 comprising a multi-layered piezoelectric element is coaxially arranged on the front surface of the front end portion of differential micrometer 114. L-shaped biasing spring 142 of phosphor bronze is attached to substrate 110 by screws 144. One surface of an upward projecting portion of spring 142 is brought into contact with actuator 116, and sample table 120 on which sample 118 is mounted is fixed to the other surface thereof, so that the sample faces the scanning probe 134.

In the scanning type tunnel microscope with the above structure, a voltage is applied to the electrodes of first actuator 116, so that sample 118 approaches scanning probe 134 until a vacuum tunnel region (about 12 Å) is established therebetween, and a tunnel current is then measured. At this time, actuator 116 urges biasing spring 142 to approach sample 118 to scanning probe 134. Thus, actuator 116 receives a reaction force proportional to the approaching distance from the biasing spring. The multi-layered piezoelectric element causes drift due to a creep. However, upon reception of the reaction force, a creep can be prevented, and a sample position can be stabilized.

In the above embodiment, a drive mechanism for moving the sample along one axis is constituted by the differential micrometer and the first actuator. However, any other structure may be employed if the sample and the scanning probe can be moved toward each other. In the above embodiment, the scanning probe is attached to second actuator 122. In contrast to this, the scanning probe may be attached to first actuator 116 and the sample may be attached to second actuator 122. At this time, if the cylindrical piezoelectric element is adopted as first actuator 116, the scanning probe can perform a three-dimensional scanning operation. The scanning operation can be performed while the scanning probe is fixed in position and the sample is moved using second actuator 122.

Figure 11:
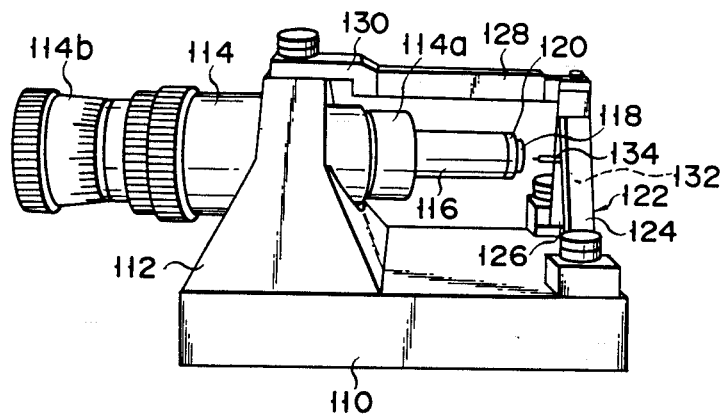
Figure 12:
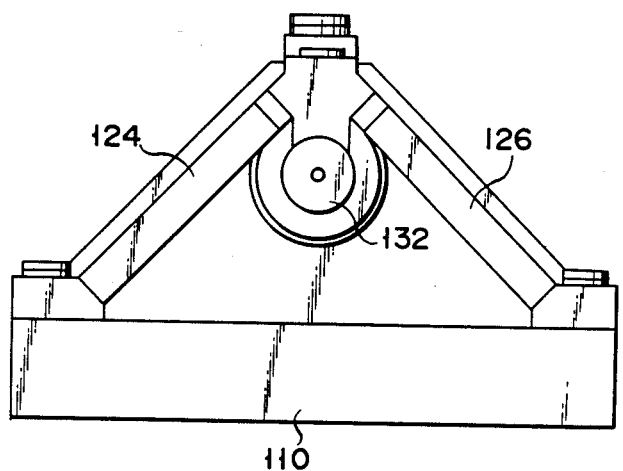

According to the aforementioned embodiments shown in FIGS. 11 to 13, first, second, and third leg portions 124, 126 and 128 are connected to one another at one end and extend at predetermined angles with reference to one another at the other end; the extended ends of first and second leg portions 124 and 126 are secured to substrate 110, while third leg portion 128 extends in the same direction as scanning probe 134; and scanning probe 134 is located between third leg portion 128 and substrate 110. With this construction, no particular space is required for the installation of third leg portion 128, so that the size of the device can be reduced as a whole. If the size of the entire device is reduced, the construction-resonant frequency, at which the device vibrates in response to external vibrations, can be increased. Therefore, the adverse effects which may be caused by the external vibrations can be eliminated remarkably. Furthermore, since the construction of the device can be made simpler than that of the prior art, thermal drift can be suppressed remarkably. Therefore, high resolution can be obtained without the necessity of driving the device under a vacuum condition. It should be also noted that the device is easy to handle.

A scanning type tunnel microscope according to a fourth embodiment of the present invention will now be described with reference to FIGS. 14 and 15.

Referring to FIG. 14, reference numeral 210 denotes a square substrate having a side of several centimeters. Substrate 210 is a stainless steel plate or an Invar alloy plate whose lower surface is polished with high precision. Substantially triangular support plate 212 projects from the left end portion of the upper surface of substrate 210. Rectangular support plate 226 projects upright from a right end portion of the upper surface of substrate 210. Differential micrometer 214 is horizontally fixed to substantially the central portion of support plate 212 to be perpendicular to plate 212. Front end portion 214a of micrometer 214 projects from the front surface of support plate 212 toward the other end of substrate 210. Operation portion 214b as the rear end portion of micrometer 214 projects from the rear surface of support plate 212. As is known, when operation portion 214b is pivoted through a predetermined angle, front end portion 214a of differential micrometer 214 is moved along the axial direction by a very small distance, and constitutes a sample rough movement drive mechanism. First actuator 216 is coaxially arranged on the front surface of the front end portion of micrometer 214. First actuator 216 is a known cylindrical piezoelectric element which has an electrode pattern allowing expansion along the X-, Y-, and Z-axes. Scanning probe 224 is coaxially fixed to the front end of actuator 216. Actuator 216 has a function of moving scanning probe 224 in the axial direction and a function of scanning it in a planar direction perpendicular to the axial direction. Multilayered composite type second actuator 222 (to be described later in detail) is fixed on the other end side of substrate 210 by support plate 226 projecting from substrate 210. Sample 218 is fixed to the distal end of second actuator 222 through sample table 220 to face scanning probe 224. Second actuator 222 has a function of moving sample 218 by a relatively large distance and a very small distance in the axial direction upon selective application of a voltage or voltages to its electrodes.

Second actuator 222 will now be described with reference to FIG. 15.

Referring to FIG. 15, reference numeral 230 denotes a first drive portion; and 232, a second drive portion. These drive portions 230 and 232 are coaxially arranged, and are bonded to each other through insulating member 234. First drive portion 230 has three piezoelectric members 238 which are laminated so that electrode 236 is sandwiched between adjacent members 238. Electrodes 236 are also formed on the surfaces of the piezoelectric members located on the outside. Second drive portion 232 has substantially the same structure as that of first drive portion 230, except that seven piezoelectric members 238 are used. Electrodes 236 are alternately connected to the negative and positive terminals of first and second power source circuits 240 and 242. Each piezoelectric member 238 is expanded or contracted upon application of a voltage through the electrodes on the both surfaces. As a result, when first power source circuit 240 is driven, first drive portion 230 is expanded or contracted. When second power source circuit 242 is driven, second drive portion 232 is expanded or contracted over a larger distance than that of first drive portion 230. When drive circuits 240 and 242 are driven at the same time, a still larger expansion/contraction distance can be obtained. Therefore, first drive portion 230 is adopted for moving the sample by a very small distance, a combination of first and second drive portions 230 and 232 is adopted for roughly moving the sample, and second drive portion 232 is adopted for moving the sample by a mean distance. The numbers of piezoelectric members in the first and second drive portions can be appropriately selected if they are different from each other. The number of the drive portions is not limited to two, but can be increased. A plurality of power source circuits are not always necessary. A single power source circuit can be used, such that a switching circuit is arranged between the drive portions.

In the microscope in the embodiment shown in FIG. 14, its operation is substantially the same as that of the previous embodiments. In contrast to this embodiment, a sample can be held by the first actuator, and a scanning probe can be held by the second actuator. More specifically, first actuator 116 shown in FIG. 11 can be arranged as shown in FIG. 15.

What is claimed is:
1. A scanning-type tunnel microscope, comprising:
   a substrate (110);
   a support (112) extending from the substrate;
   a sample holding member (120) for supporting a sample (118);

a scanning probe (134) which extends in an axial direction toward, and faces, said sample (118), to be separated therefrom by a predetermined distance;

means for applying a voltage between the sample and scanning probe to flow a tunnel current therebetween;

a scanning probe holding member (132) for supporting said scanning probe (134); and a first actuator (116) coupled to said sample holding member (120) and a second actuator (122) coupled to said scanning probe holding member (132), said first and second actuators relatively driving said sample and scanning probe in the axial direction and a plane direction through said sample holding member and said scanning probe holding member;

one (122) of said actuators including first, second and third elongated members (124, 126, 128) which are extensible in their longitudinal directions when signals are received, all said elongated members extending at predetermined angles with respect to one another and being joined at first ends of each, said first and second elongated members (124,126) being fixed on the substrate (110) at their other ends, said third elongated member (128) extending and spaced from the substrate and fixed to the support (112), said joined ends of the elongated members (124, 126, 128) supporting one of the sample and scanning probe holding members, and said sample and scanning probe positioned between the substrate and third elongated member, the substrate (110), support (112), third elongated member (128), and first and second elongated members (124,126) defining a closed frame in which said sample (118) and scanning probe are positioned.

2. A microscope according to claim 1 which further includes a mechanical actuator supported by the substrate and moving the other one (116) of said first and second actuators in the axial direction.

3. A microscope according to claim 2 wherein said mechanical actuator includes a differential micrometer extending through the support and having an extended end supporting the other end of said first and second actuators.

4. A microscope according to claim 3 which includes biasing means for urging the other one (116) of said first and second actuators toward the differential micrometer.

5. A microscope according to claim 4 wherein said urging means includes a spring plate having one end fixed on the substrate and a free end, the free end having one surface supporting the sample holding member and opposite surface contacting the other one (116) of said first and second actuators.

6. A microscope according to claim 1 wherein the other one of said first and second actuators comprises a multi-layered actuator which has a plurality of electrodes and piezoelectric members interposed between adjacent electrodes, said multi-layered actuator being expandable and contractable in the axial direction, and said multi-layered actuator having one end for supporting one of the sample holding member and scanning probe holding member.

7. A microscope according to claim 6 wherein said multi-layered actuator has a plurality of regions having different numbers of piezoelectric members, and an insulating member arranged between adjacent regions.

8. A microscope according to claim 1 wherein each elongated member of said one of the first and second actuators includes an elongated piezoelectric member, three elongated members connected to define right angles, respectively and said third elongated member (128) extending in the axial direction.

9. A microscope according to claim 8 wherein each of said piezoelectric members comprises of a multi-layered piezoelectric member.

10. A microscope according to claim 8 wherein each of said first and second elongated members comprises a multi-layered piezoelectric member and said third elongated member comprises a single elongated piezoelectric member.

11. A microscope according to claim 1, wherein said substrate includes a plane surface on which said support and first and second elongated members are positioned, the third elongated member and plane surface of the substrate extending substantially in parallel with each other.

12. A scanning-type tunnel microscope comprising:

a sample holding member for supporting a sample;

a scanning probe which is arranged to face said sample and to be separated therefrom by a predetermined distance, means for applying a tunneling current between said sample and said scanning probe a scanning probe holding member for supporting said scanning probe; and a first actuator coupled to said sample holding member and a second actuator coupled to said scanning probe holding member, said first and second actuators having an identical or similar shape, arranged to face each other and including means for relatively driving said sample and said scanning probe in an axial direction and in a planar direction through said sample holding member and said scanning probe holding member.

13. A microscope according to claim 12, wherein said first actuator has a plane portion and a leg portion which projects from the center of said plane portion and is coupled to said sample holding member at its distal end, said plane portion having a plurality of electrodes arranged in a matrix and piezoelectric members interposed between adjacent electrodes and said leg portion having at least one electrode and at least one piezoelectric member connected to said electrode, and said second actuator has a plane portion and a leg portion which projects from the center of said surface portion and is coupled to said sample holding member at its distal end, said plane portion having a plurality of electrodes arranged in a matrix and piezoelectric members interposed between adjacent electrodes and said leg portion having at least one electrode and at least one piezoelectric member connected to said electrode, said leg portions of said first and second actuators being located on an identical axis.

14. A microscope according to claim 13 which further includes a differential micrometer for moving one of the actuators in the axial direction and means for fixing the other one of the actuators and the differential micrometer.

15. A microscope according to claim 14 which further includes elastic urging means for urging said one of the actuators towards the differential micrometer.

16. A microscope according to claim 13 wherein said piezoelectric members and electrodes are made of metal blocks and are arranged such that their rolling directions are aligned in a predetermined direction.

17. A microscope according to claim 16 wherein said electrodes and piezoelectric members include a recess-projection coupling indicating a rolling direction.

18. A microscope according to claim 13 which includes a metal foil, a lead wire and solder connecting one end of the lead wire and the metal foil, the metal foil being adhered to at least one of the electrodes.

19. A microscope according to claim 12 wherein at least one of said sample holding member and scanning probe holding member has a three layered structure comprising two connectors and an insulating member sandwiched therebetween.

* * * * *